United States Patent
Iijima

(10) Patent No.: US 10,606,234 B2
(45) Date of Patent: Mar. 31, 2020

(54) CONTROLLER FOR A PLURALITY OF MOTORS BASED ON PROVIDED TORQUE

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 39 days.

(21) Appl. No.: 16/132,938

(22) Filed: Sep. 17, 2018

(65) Prior Publication Data

US 2019/0113904 A1 Apr. 18, 2019

(30) Foreign Application Priority Data

Oct. 18, 2017 (JP) .................................. 2017-201646

(51) Int. Cl.
| | |
|---|---|
| *G05B 19/19* | (2006.01) |
| *G05D 3/20* | (2006.01) |
| *G05D 13/62* | (2006.01) |
| *G05D 17/02* | (2006.01) |

(52) U.S. Cl.
CPC .............. *G05B 19/19* (2013.01); *G05D 3/20* (2013.01); *G05D 13/62* (2013.01); *G05D 17/02* (2013.01)

(58) Field of Classification Search
None
See application file for complete search history.

(56) References Cited

U.S. PATENT DOCUMENTS

| | | | | |
|---|---|---|---|---|
| 2005/0127789 A1* | 6/2005 | Magnussen | ......... | H01L 41/0906 310/328 |
| 2006/0001392 A1* | 1/2006 | Ajima | ..................... | B62D 5/046 318/432 |
| 2007/0282511 A1* | 12/2007 | Henry | ..................... | G05B 19/19 701/70 |

FOREIGN PATENT DOCUMENTS

| | | |
|---|---|---|
| JP | 4-109890 | 4/1992 |
| JP | 7-241093 | 9/1995 |
| JP | 2008-222334 | 9/2008 |
| JP | 2010-172054 | 8/2010 |
| JP | 2014-178753 | 9/2014 |
| JP | 2014-207770 | 10/2014 |

OTHER PUBLICATIONS

Notification of Reasons for Refusal dated Jul. 23, 2019 in Japanese Patent Application No. 2017-201646.

* cited by examiner

*Primary Examiner* — Mohammad Ali
*Assistant Examiner* — Saad M Kabir
(74) *Attorney, Agent, or Firm* — Wenderoth, Lind & Ponack, L.L.P.

(57) ABSTRACT

In a controller of the present invention that controls a drive mechanism driven by a plurality of motors, when a state where the output of the motors is zero shifts to a state where the output is non-zero such that a preload torque is provided by a preload torque superimposition unit, at least one of the motors forms a contact portion between the drive mechanism and the motor by speed control based on a speed detection value detected in a speed detection unit, and in a state where the contact portion is formed, the preload torque is provided by the preload torque superimposition unit.

2 Claims, 7 Drawing Sheets

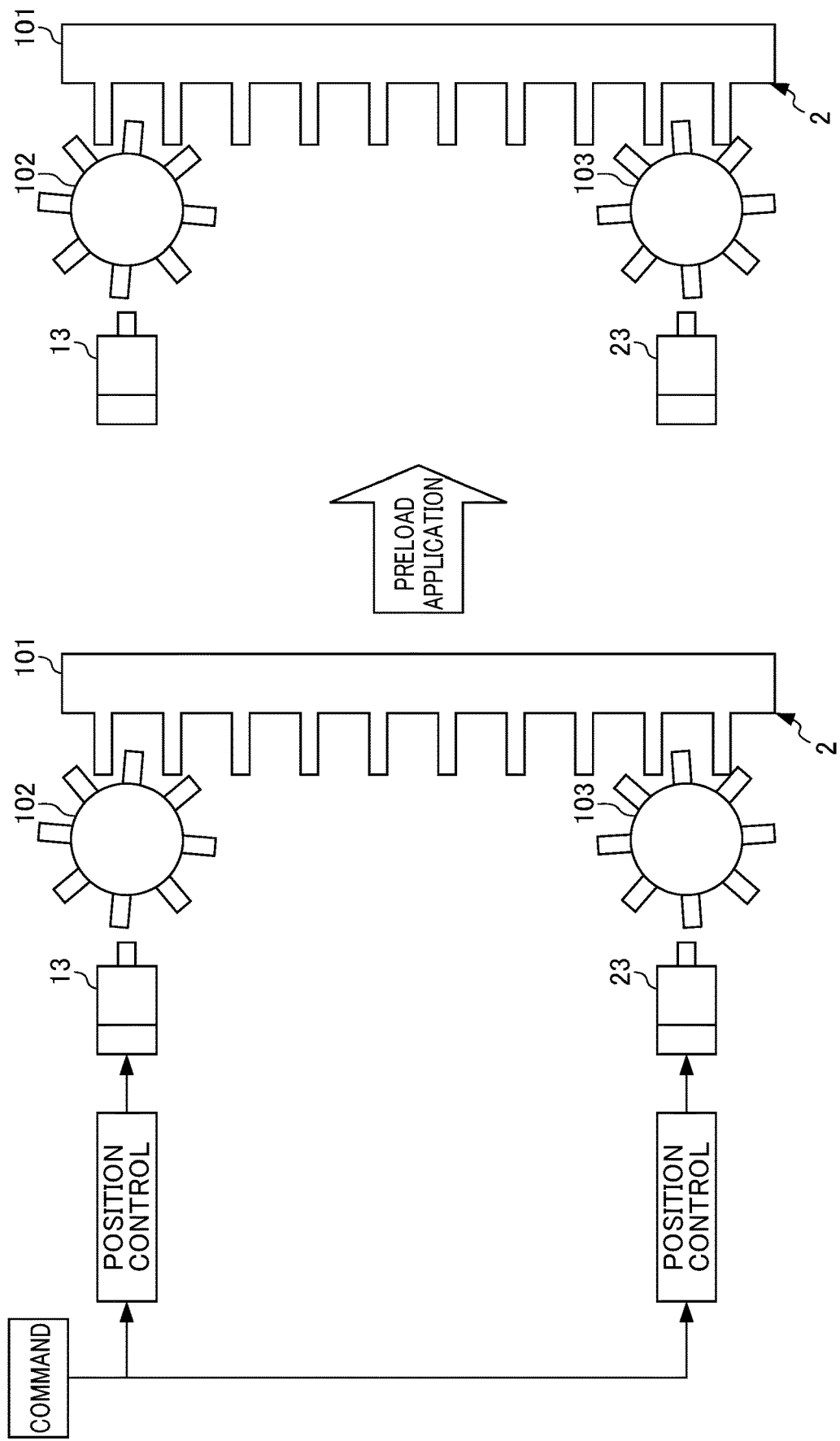

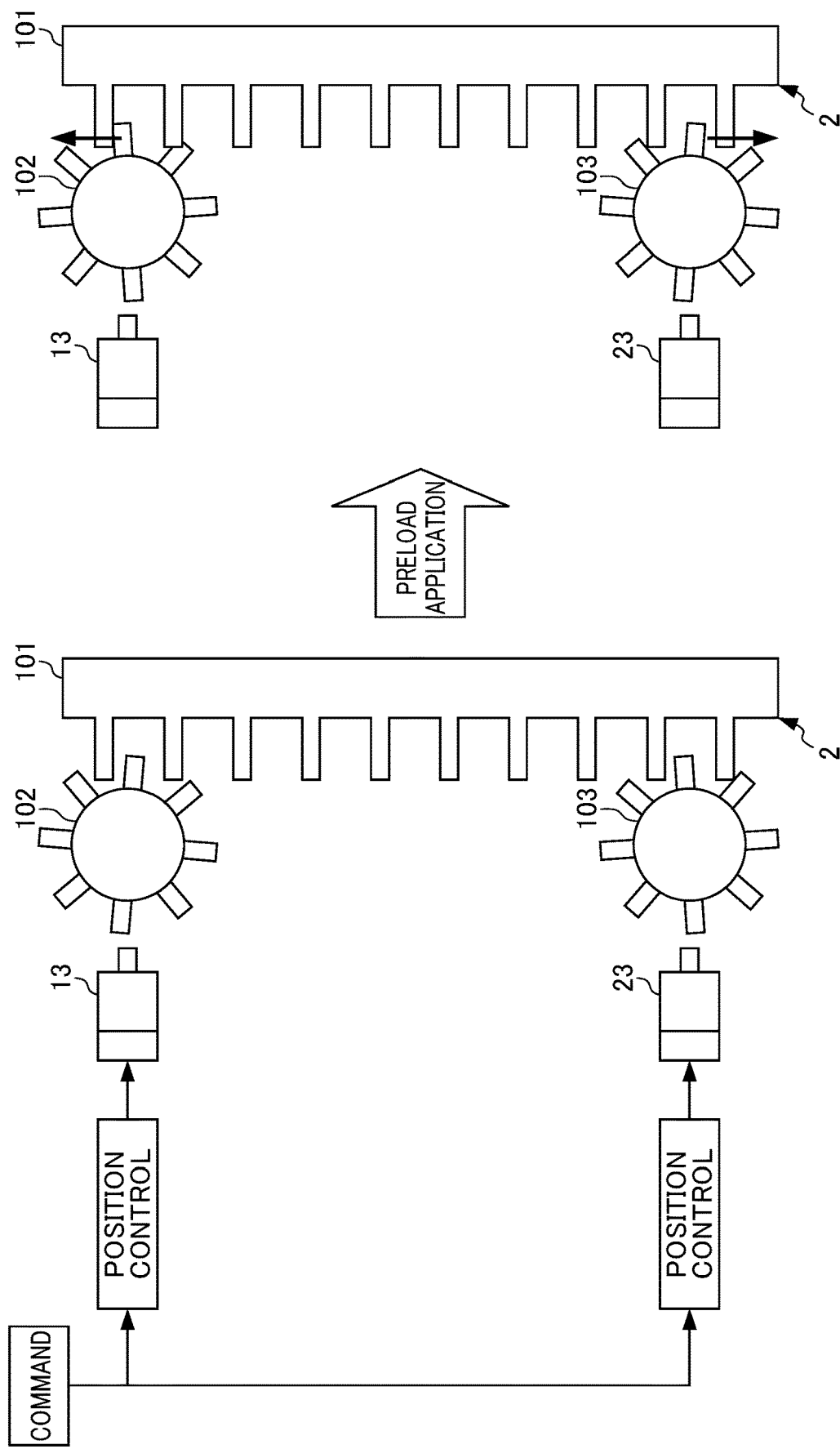

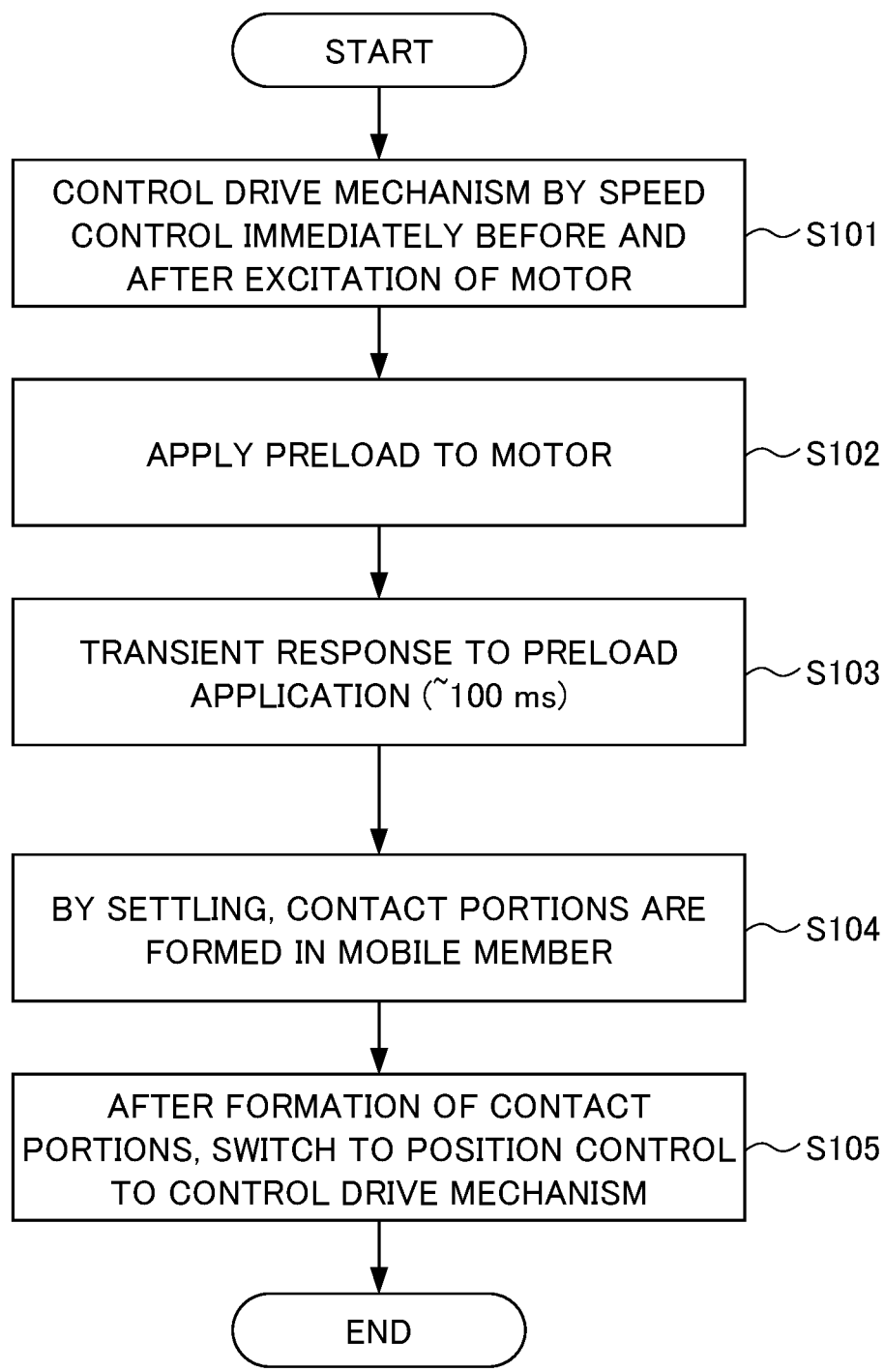

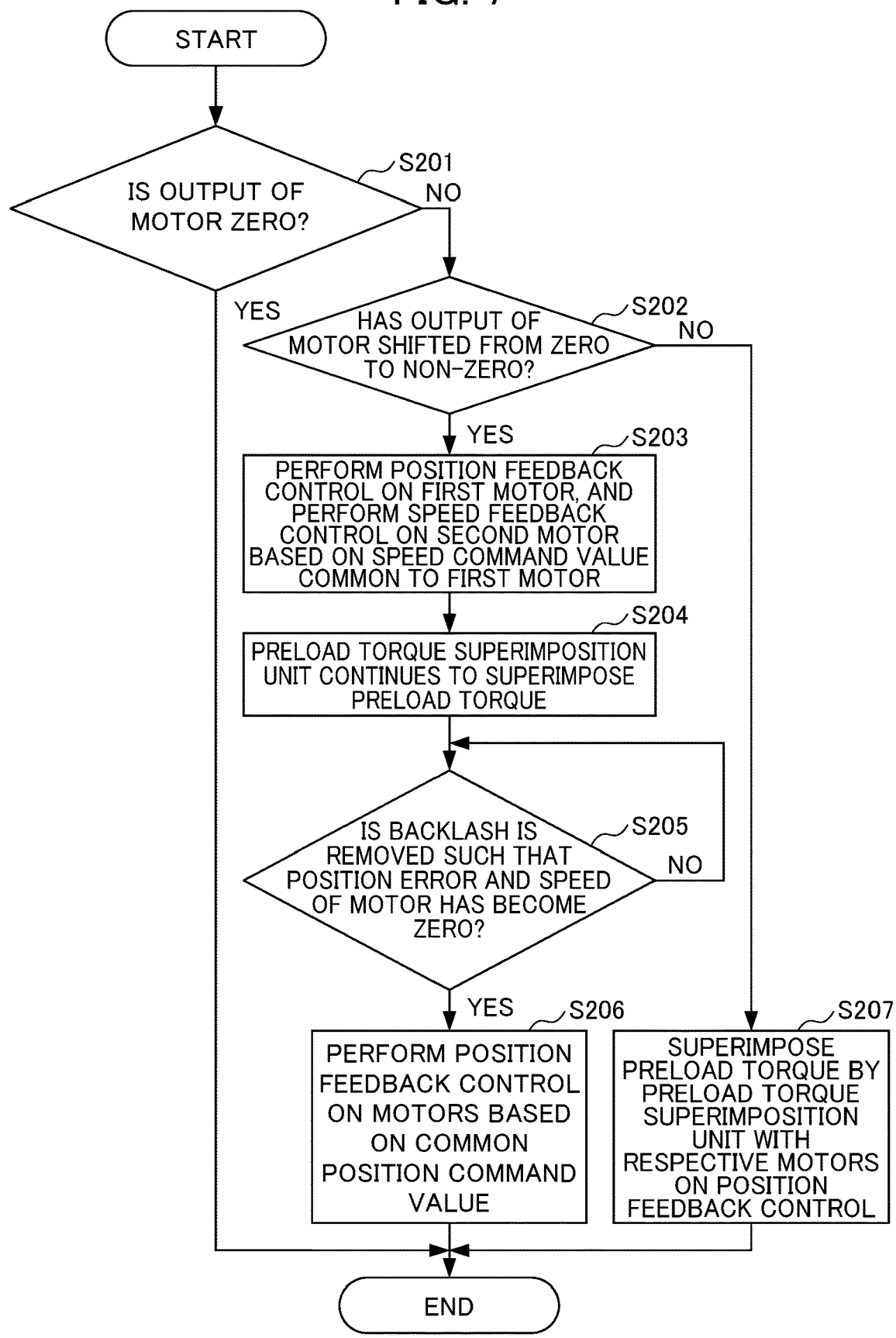

CONTROLLER FOR A PLURALITY OF MOTORS BASED ON PROVIDED TORQUE

This application is based on and claims the benefit of priority from Japanese Patent Application No. 2017-201646, filed on 18 Oct. 2017, the content of which is incorporated herein by reference.

BACKGROUND OF THE INVENTION

Field of the Invention

The present invention relates to a controller for a drive mechanism which is driven by a plurality of motors.

Related Art

Conventionally, a technology is known wherein, in a controller for controlling a tandem mechanism that drives a drive mechanism such as a robot or a machine tool with a plurality of motors, a preload torque is added to a torque command value for controlling the motors so as to reduce backlash. Patent documents 1 to 3 disclose this type of technology.

Patent document 1 discloses a technology wherein two motors that drive one driven member, a position control unit that performs computation processing on a position error value so as to output a speed command value, a speed control unit that performs processing based on the speed command value and a speed feedback value fed back from a speed detector with an integral element and a proportional element so as to output a torque command value, a current control unit that controls a drive current for the motors based on the torque command value, a speed integrator sharing means that copies an output of one integral element to the other integral element in the speed control unit, and a compensation unit that adds a preload torque value to each torque command value in order to reduce backlash between the two motors are provided, and the compensation unit has a time constant circuit and gradually adds the preload torque value based on a predetermined time constant.

Patent document 2 discloses as a motor controller that can, when one driven member is driven by two motors, reduce backlash between a machine element and the driven member in a transmission mechanism connected to the drive axes of motors even during the acceleration/deceleration of the motors, a technology wherein a first preload torque value calculation unit that calculates according to the acceleration of the main motor a preload torque value which is a torque value added in advance to a torque command value such that the direction of a force applied to the drive axis of the main motor and the direction of a force applied to the drive axis of the sub-motor are opposite to each other, and a second preload torque value calculation unit that calculates according to the acceleration of the sub-motor a preload torque which is a torque value added in advance to a torque command value such that the direction of the force applied to the drive axis of the main motor and the direction of the force applied to the drive axis of the sub-motor are opposite to each other are provided.

Patent document 3 discloses a technology wherein, in a motor controller that performs tandem control for driving one movable unit, a position control unit, a speed control unit, and a current control unit are provided for each motor, a torque arbitration control unit that computes a torque arbitration value for calculating an arbitration torque from a difference between a torque command computed in the speed control unit and a torque command computed in the speed control unite, and a preload control unit that adds a preload torque to the torque command are provided, and the preload control unit computes the minimum preload torque necessary for reduction of backlash according to the position of the movable unit.

Patent Document 1: Japanese Unexamined Patent Application, Publication No. 2010-172054
Patent Document 2: Japanese Unexamined Patent Application, Publication No. 2014-178753
Patent Document 3: Japanese Unexamined Patent Application, Publication No. 2014-207770

SUMMARY OF THE INVENTION

Even when a preload torque is added to a torque command value, if a gap caused by structurally necessary play is present between a motor and a drive mechanism in an initial state, even when the preload torque is provided electrically, it cannot function mechanically. Although patent document 1 and patent document 2 disclose technologies wherein the preload is provided by speed control, since it presupposes a state where backlash is already removed due to an addition of a fixed preload, there is room for improvement in appropriately providing the preload torque in the initial state.

Moreover, although patent document 3 discloses that the preload torque is provided by position control, since, in the case of position control, the individual motors try to stay in their positions in a state where a gap is present, there are cases where contact portions (contact surfaces) of the motors and the drive mechanism are not formed within the play of the structure. As described above, if the contact portions (contact surfaces) are not formed, the preload torque provided for control does not physically act.

An object of the present invention is to provide a configuration in which in a controller that controls a drive mechanism driven by a plurality of motors, a preload (preload torque) can be applied stably and uniformly.

(1) The present invention relates to a controller (for example, a controller 1 which will be described later) for a drive mechanism (for example, a drive mechanism 2 which will be described later) which is driven by a plurality of motors (for example, motors 13 and 23 which will be described later) which includes, according to the motors: a position command calculation unit (for example, a position command calculation unit 10 which will be described later) which calculates a position command value for driving the drive mechanism; a position detection unit (for example, a position detection unit 14, 24 which will be described later) which detects the position of the motor; a speed command calculation unit (for example, a speed command calculation unit 11, 21 which will be described later) which calculates a speed command value based on a position error value determined from the position command value calculated by the position command calculation unit and a position detection value detected by the position detection unit; a speed detection unit (for example, a speed detection units 15, 25 which will be described later) which calculates a speed detection value from the position detection value detected by the position detection unit; a torque command calculation unit (for example, a torque command calculation unit 12, 22 which will be described later) which calculates a torque command value from a speed error value determined from the speed command value calculated by the speed command calculation unit and the speed detection value detected by the speed detection unit; and a preload torque superimposition unit (for example, a preload torque superimposition unit 30 which will be described later) which superimposes a set preload torque on the torque command value, wherein, when a state where there is zero output from the motors shifts to a state where the output is non-zero such that the preload torque is provided by the preload torque superimposition unit, at least one of the motors forms a contact portion between the drive mechanism and the motor by speed control based on the speed detection value detected in the speed detection unit such that the preload torque is provided.

(2) In the controller described in (1), when a state where there is zero output from the motors shifts to a state where the output is non-zero such that the preload torque is provided by the preload torque superimposition unit, position control may be performed on at least one of the motors based on the position detection value detected in the position detection unit while the speed control as performed on at least one of the motors so as to form the contact portion, and in a state where the contact portion is formed, the preload torque may be provided by the preload torque superimposition unit.

(3) In the controller described in (1) or (2), the controller may control the motors such that, in a state where the contact portion is formed so as to remove a gap between the side of the drive mechanism and the side of the motor, the motor subjected to the speed control is switched to position control based on the position command value calculated by the position command calculation unit so that the preload torque is provided.

According to the present invention, it is possible to apply a preload stably uniformly in a controlled that controls a drive mechanism driven by a plurality of motors,

BRIEF DESCRIPTION OF THE DRAWINGS

FIG. 4 is a schematic view showing a case where, in the position feedback of a comparative example, the control of a drive mechanism is performed before and after excitation;

FIG. 5 is a schematic view showing a case where, in the speed feedback of the present embodiment, the control of a drive mechanism is performed before and after excitation;

FIG. 6 is a flowchart showing the overall flow of switching of the control of the drive mechanism by the controller of the present embodiment; and FIG. 7 is a flowchart showing a specific example of switching processing of feedback control by the controller of the present embodiment.

DETAILED DESCRIPTION OF THE INVENTION

A preferred embodiment of the present invention will be described below with reference to drawings.

Figure 1:
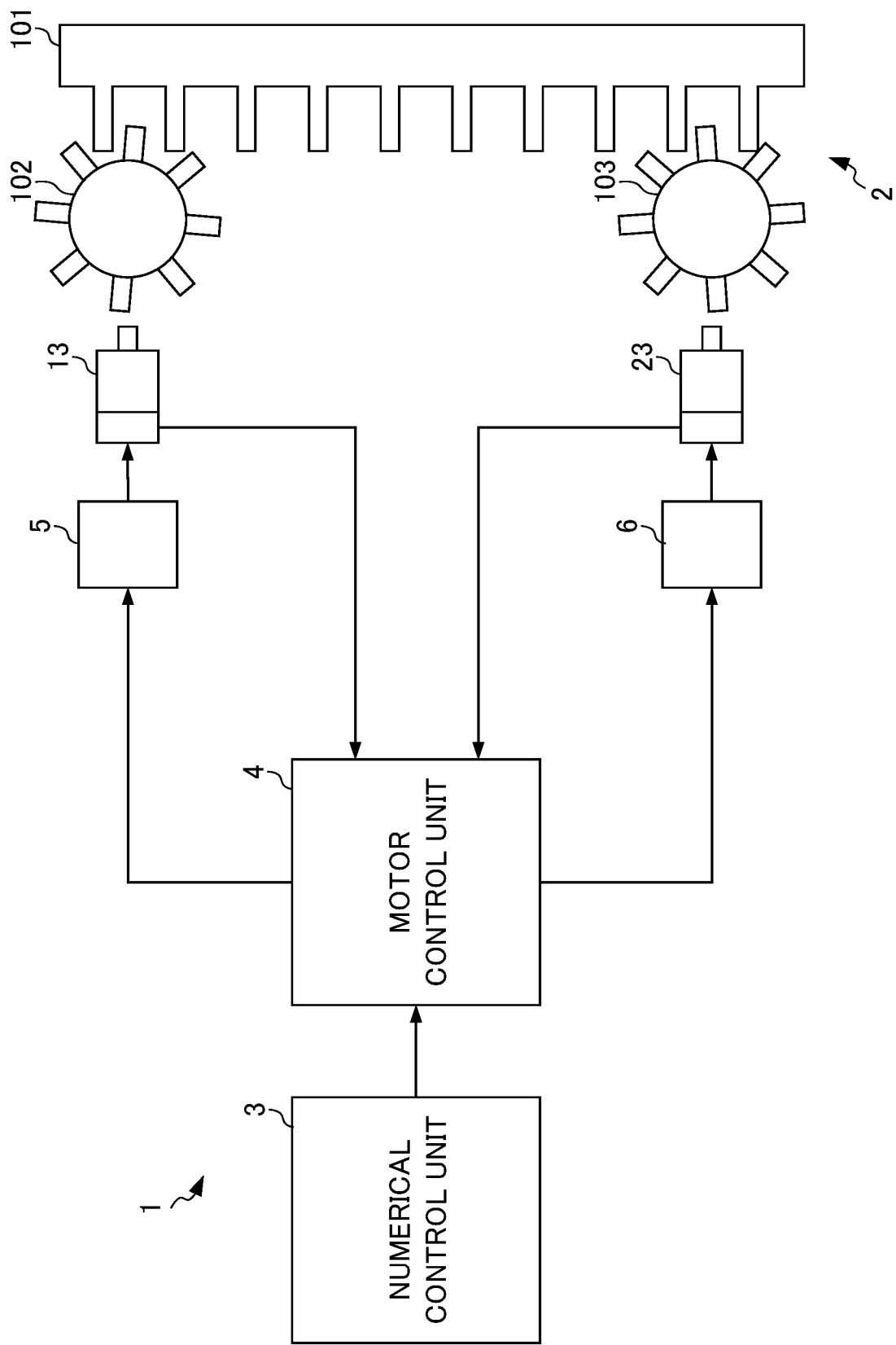
FIG. 1 is a schematic view showing a configuration for performing tandem control in a controller according to an embodiment of the present invention.

A device configuration in which a controller 1 of the present embodiment is used will first be described. FIG. 1 is a schematic view showing a configuration for performing tandem control in the controller 1 according to the embodiment of the present invention. The device configuration with reference to FIG. 1 is an example, and the device configuration to which the controller 1 is applied is not limited to the example shown in FIG. 1.

The controller 1 is intended for performing tandem control in which one drive mechanism 2 is driven by a plurality of (two) motors 13 and 23. The drive mechanism 2 is a robot, a machine tool or the like which is formed with a mobile member 101 and mechanical parts 102 and 103 such as gears. A drive force is transmitted from the motor 13 through the mechanical part 102 to the mobile member 101, and a drive force is transmitted from the motor 23 through the mechanical part 103 thereto.

The controller 1 of the present embodiment includes a numerical control unit 3 and a motor control unit 4. The numerical control unit 3 is a CNC (Computerized Numerical Control), and performs various types of processing for operating the drive mechanism 2. Based on a command from a numerical controller 20, the motor control unit 4 performs current control on the motor 13 through an amplifier 5, and performs current control on the motor 23 through an amplifier 6. The motors 13 and 23 are servo motors, and the motor control unit 4 receives feedback signals for acquiring a position and a speed from each of the motors 13 and 23.

Figure 2:
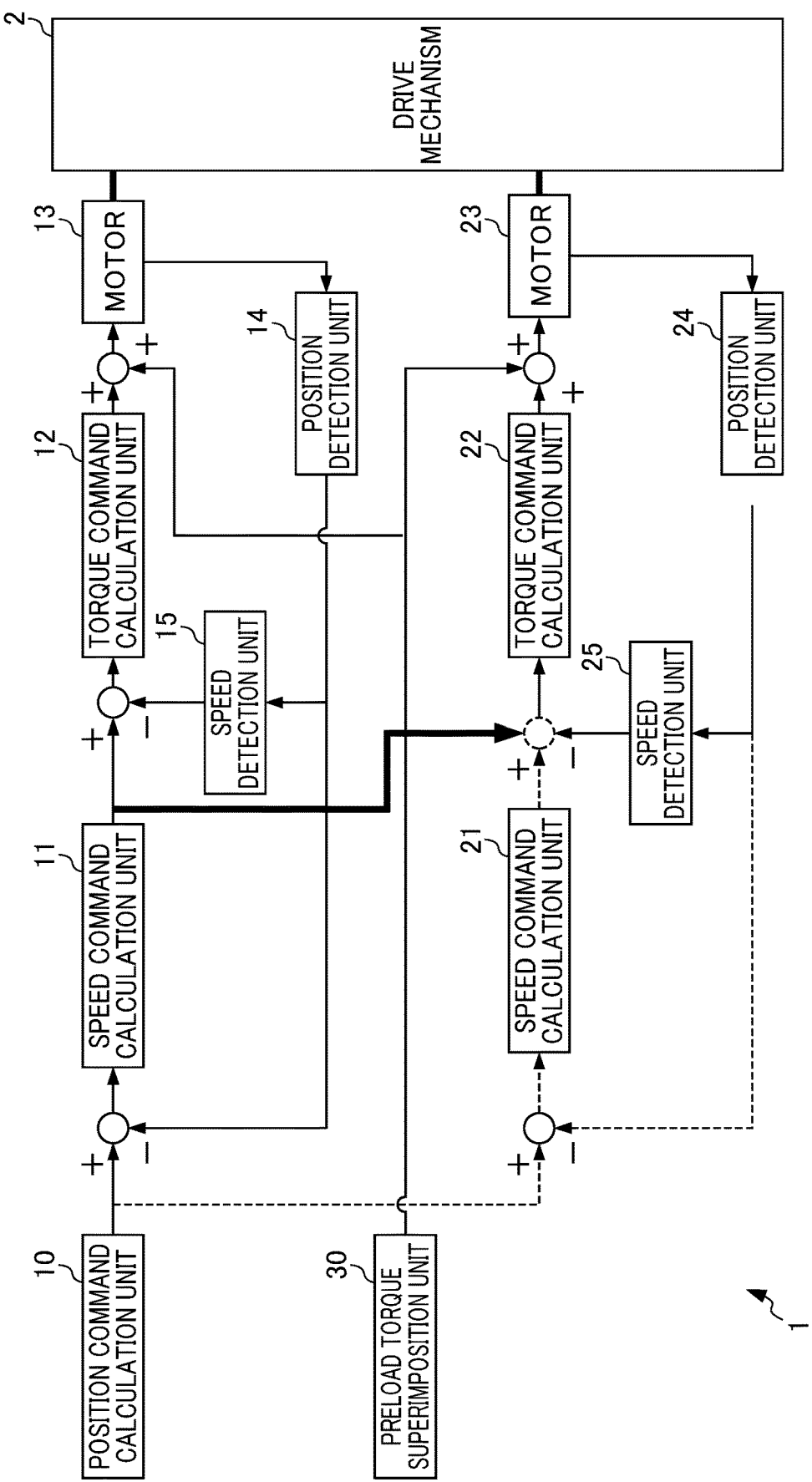
FIG. 2 is a block diagram showing the flow of signals at the time of speed feedback in the controller of the present embodiment.
Figure 3:
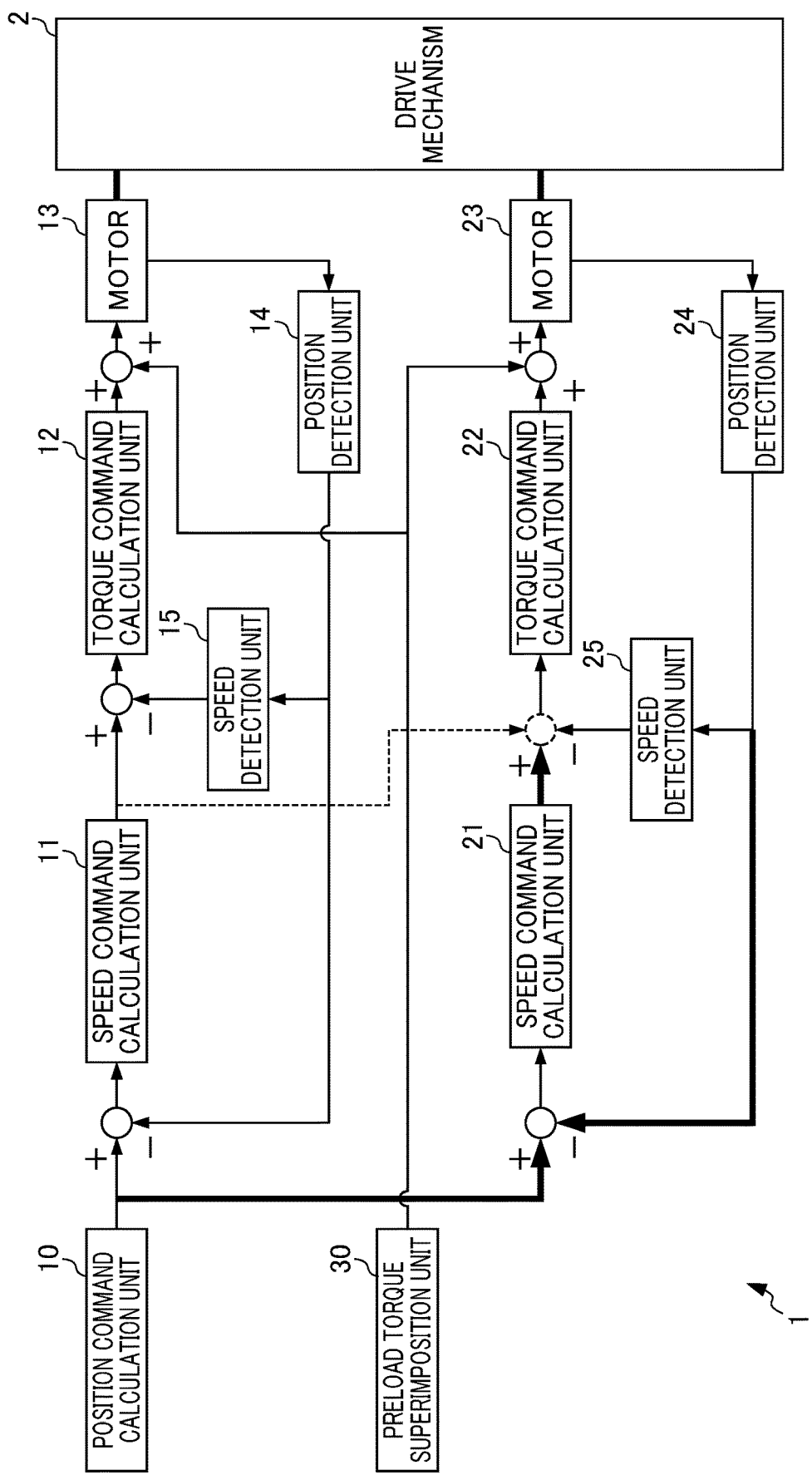
FIG. 3 is a block diagram showing the flow of signals at the time of position feedback in the controller of the present embodiment.

FIG. 2 is a block diagram showing the flow of signals at the time of speed feedback in the controller 1 of the present embodiment. FIG. 3 is a block diagram showing the flow of signals at the time of position feedback in the controller 1 of the present embodiment. As shown in FIGS. 2 and 3, the controller 1 includes a position command calculation unit 10, position detection units 14 and 24, speed detection units 15 and 25, speed command calculation units 11 and 21, torque command calculation units 12 and 22, and a preload torque superimposition unit 30.

The position command calculation unit 10, the position detection units 14 and 24, the speed detection units 15 and 25, the speed command calculation units 11 and 21, the torque command calculation units 12 and 22, and the preload torque superimposition unit 30 are realized by hardware such as the numerical control unit 3, the motor control unit 4, and the motors 13 and 23. The configurations of these individual units in the controller 1 are not limited to any one of the numerical control unit 3 and the motor control unit 4, and the functions of the individual units may be achieved by cooperation of the numerical control unit 3 and the motor control unit 4, or the functions of the individual units may be achieved by an external device connected through a network.

The position command calculation unit 10 calculates, based on a predetermined program, a position command value for moving the mobile member 101 of the drive mechanism 2 to a predetermined position.

The position detection unit 14 detects the position (rotation angle) of the motor 13, and the position detection unit 24 detects the position (rotation angle) of the motor 23. The position detection units 14 and 24 of the present embodiment are individually formed with encoders for the motors 13 and 23.

The speed detection unit 15 detects, based on a position detection value detected by the position detection unit 14, a speed detection value corresponding to the motor 13, and the speed detection unit 25 detects, based on a position detection value detected by the position detection unit 24, a speed detection value corresponding to the motor 23.

The speed command calculation unit 11 calculates, based on the position command value input from the position command calculation unit 10 and the position detection value detected by the position detection unit 14, a speed command value, and the speed command calculation unit 21 calculates, based on the position command value input from the position command calculation unit 10 and the position detection value detected by the position detection unit 24, a speed command value. The speed command value is calculated by P control with consideration given to a proportional element. The speed command value may be calculated such as by PID control with consideration given to a proportional element, an integral element, and a derivative element; and, as a method of calculating the speed command value, an appropriate method can be selected according to circumstances.

The torque command calculation unit 12 calculates the torque command value for the motor 13 based on the speed command value calculated by the speed command calculation unit 11 and the speed detection value detected by the speed detection unit 15. The torque command calculation unit 22 calculates the torque command value for the motor 23 based on the speed command value calculated by the speed command calculation unit 11 or the speed command value calculated by the speed command calculation unit 21 and the speed detection value detected by the speed detection unit 25. The torque command value is calculated by PID control with consideration given to the proportional element, the integral element, and the derivative element; or PI control with consideration given to the proportional element and the integral element. The torque command value is preferably calculated by control including at least the integral element so that a steady error is set to zero in an internal model principle.

The preload torque superimposition unit 30 adds a set preload torque to the torque command value. In preload processing for providing a preload, the motor 13 is driven and controlled based on a value obtained by superimposing the preload torque on the torque command value calculated by the torque command calculation unit 12, and the motor 23 is driven and controlled based on a value obtained by superimposing the preload torque on the torque command value calculated by the torque command calculation unit 22.

When the preload torque is provided by electrical control, in a state where contact portions (contact surfaces) are not formed by the motors 13 and 23 and the drive mechanism 2 in an initial operation, the preload torque is not physically acting despite being electrically added. This state will be described with reference to FIG. 1. FIG. 4 is a schematic view showing a case where, in the position feedback of a comparative example, the control of the drive mechanism 2 is performed before and after excitation. As shown in FIG. 4, if, in the initial operation, position control is performed in a state where the contact portions are not formed by the mechanical parts 102 and 103 of the motors 13 and 23 and the mobile member 101 of the drive mechanism 2, the mechanical parts 102 and 103 try to stay in their original positions, respectively. Hence, a state where gaps are formed between the mechanical parts 102 and 103 and the mobile member 101 is maintained. Therefore, the contact portions cannot be formed, and thus the preload torque is provided in terms of control but not physically.

FIG. 5 is a schematic view showing a case where, in the speed feedback of the present embodiment, the control of the drive mechanism 2 is performed before and after excitation. In speed feedback, since the position control is not as strict as compared with position feedback, coasting occurs upon positioning. Additionally, the application of the preload corresponds to the step disturbance for speed control. Hence, in the initial operation, speed control is performed until the speed becomes zero in a disturbance response, and thus it becomes possible to form contact portions with the mechanical parts 102 and 103 of the motors 13 and 23 and the mobile member 101 of the drive mechanism 2.

In the present embodiment, the control of the drive mechanism 2 is performed in the initial operation by speed feedback shown in FIG. 2 to enter a state where the preload is physically applied, and thereafter, processing performed for progressing to the control of position feedback shown in FIG. 3. FIG. 6 is a flowchart showing the overall flow of switching of the control of the drive mechanism 2 by the controller 1 of the present embodiment.

As shown in FIG. 6, immediately before and after the excitation of the motors 13 and 23, the control of the drive mechanism 2 is started by speed control (step S101). The preload is applied to the motors 13 and 23 (step S102). Then, a transient response (to 100 ms) to the application of the preload detected (step S103). By settling, the contact portions are formed in the mobile member 101 (step S104). By the processing of steps S103 and S104, a delay caused by a mechanical response time in the motors 13 and 23 is considered, and the formation of contact portions between the mechanical parts 102 and 103 of the motors 13 and 23 and the mobile member 101 of the drive mechanism 2 are ensured (a state on the right side of the plane of FIG. 5). The contact portions are formed by contact of the mechanical parts 102 and 103 of the motors 13 and 23 and the mobile member 101 of the drive mechanism 2, and thereafter the control of the drive mechanism 2 is switched to position feedback (step S105).

FIG. 7 is a flowchart showing a specific example of switching processing of feedback control by the controller 1 of the present embodiment. Specific processing of individual configurations in the controller 1 when the feedback control is switched will be now described with reference to FIGS. 2 and 3.

First, in order to detect whether or not a voltage is applied to the motors 13 and 23, monitoring is performed with regards to whether or not the output is zero (step S201), and thus it is determined whether or not a zero output has shifted to a non-zero output (step S202).

When the output shifts to a non-zero state in the determination of step S202, the process progresses to step S203. In step S203, position feedback control is performed on the first motor 13, and a common speed command value is delivered to the other motor 23 to perform speed feedback control. Specifically, the controller 1 controls the first motor 13 and the second motor 23 based on a speed command value calculated by the speed command calculation unit 11 based on the position command value of the position command calculation unit 10 and the position detection value of the position detection unit 14 (see FIG. 2).

After the processing in step S203, the preload torque superimposition unit 30 continues to superimpose the preload torque (step S204), and it is determined whether or not backlash in the drive mechanism 2 is removed such that the position error and the speed of the motors 13 and 23 have become zero (step S205). The preload torque continues to be superimposed until the backlash in the drive mechanism 2 is removed such that the position error and the speed of the motors 13 and 23 have become zero. When the backlash in the drive mechanism 2 is removed in the processing of step S205 such that the position error and the speed of the motors 13 and 23 become zero, the process progresses to step S206.

In step S206, position feedback control is performed on the first motor 13, and a common position command value is delivered to the other motor 23 to perform position feedback control. Specifically, after the switching from speed control to position control, the controller 1 controls the motors 13 and 23 (see FIG. 3) based on the common position command value calculated by the position command calculation unit 10.

When the output does not shift to the non-zero state in step S202, a processing is performed where, without speed feedback control being performed, the preload torque is superimposed by the preload torque superimposition unit 30 with both the motors 13 and 23 under position feedback control (step S207). When the output of the motor remains zero in the processing of step S201, the flow is completed without the process progressing to the processing of step S202.

In the embodiment described above, the following effects are achieved. Specifically, the controller 1 incudes, according to the individual motors 13 and 23: the position command calculation unit 10 which calculates the position command value for driving the drive mechanism 2; the position detection units 14 and 24 which detect the positions of the motors 13 and 23; the speed command calculation units 11 and 21 which calculate the speed command values based on the position error values determined from the position command value calculated by the position command calculation unit 10 and the position detection values detected by the position detection units 14 and 24; the speed detection units 15 and 25 which calculate the speed detection values from the position detection values detected by the position detection units 14 and 21; the torque command calculation units 12 and 22 which calculate the torque command values from the speed error values determined from the speed command values calculated by the speed command calculation units 11 and 21 and the speed detection values detected by the speed detection units 15 and 25; and the preload torque superimposition unit 30 which superimposes the set preload torque on the torque command value. In the controller 1, when a state where the output of the motors 13 and 23 is zero shifts to a state where the output is non-zero such that the preload torque is provided by the preload torque superimposition unit 30, at least the one motor 23 of the motors 13 and 23 forms contact portions between the drive mechanism 2 and the motors 13 and 23 by speed control based on the speed detection value detected in the speed detection unit 15, and in a state where the contact portions are formed, the preload torque is provided by the preload torque superimposition unit 30.

In this way, even if gaps are present between the side of the motors 13 and 23 (the mechanical parts 102 and 103) and the side of the drive mechanism 2 (the mobile member 101) at the time when the power is turned on or during startup following an emergency stop, the contact portions can be formed by utilization of coasting caused by speed control. Hence, in the configuration of the present embodiment, even at the time of startup, the preload torque can be ensured to act not only in terms of control but also physically.

Moreover, in the controller 1 of the present embodiment, when a state where the output of the motors 13 and 23 is zero shifts to a state where the output is non-zero such that the preload torque is provided by the preload torque superimposition unit 30, position control is performed or the first motor 13 based on the position detection value detected in the position detection unit 14 and speed control is performed on the second motor 23 so as to form the contact portions, and in a state where the contact portions are formed, the preload torque is provided by the preload torque superimposition unit 30.

In this way, it becomes easier to perform position management by performing position control on one of the motors 13 and 23. For example, in a machine tool in which the mobile member 101 is a feed axis, if one motor 13 which performs position control in an initial operation is present, it is possible to easily perform position management, resulting in that an advantageous effect achieved in terms of control.

The controller 1 of the present embodiment controls the motors 13 and 23 such that, in a state where the contact portions are formed to remove the gaps between the side of the drive mechanism 2 and the side of the motors 13 and 23, the motors 13 and 23 subjected to speed control are switched to position control based on the position command value calculated by the position command calculation unit 10 and thus the preload torque is provided.

In this way, the drive mechanism 2 can be driven by an accurate position control in a state where the preload torque is ensured to be physically provided.

Although the preferred embodiment of the present invention is described above, the present invention is not limited to the embodiment described above, and modifications can be made as necessary. For example, although in the embodiment described above, a processing is performed in step S203 wherein position control is performed on the motor 13 and speed control is performed on the motor 23, there is no limitation to this processing. In the processing of step S203, a modification may be made such that speed control is performed on both motors 13 and 23 based on the speeds detected by the speed detection units 15 and 25.

EXPLANATION OF REFERENCE NUMERALS

1 controller
2 drive mechanism
11, 21 speed command calculation unit
12, 22 torque command calculation unit
13, 23 motor
14, 24 position detection unit
15, 25 speed detection unit
30 preload torque superimposition unit.

What is claimed is:

1. A controller for a drive mechanism which is driven by a plurality of motors, the controller comprising:
   a position command calculation unit which calculates a position command value for driving the drive mechanism;
   a position detection unit which detects a position of each of the motors;
   a speed command calculation unit which calculates a speed command value based on a position error value determined from the position command value calculated by the position command calculation unit and a position detection value detected by the position detection unit;
   a speed detection unit which calculates a speed detection value from the position detection value detected by the position detection unit;
   a torque command calculation unit which calculates a torque command value from a speed error value determined from the speed command value calculated by the speed command calculation unit and the speed detection value detected by the speed detection unit; and
   a preload torque superimposition unit which superimposes a set preload torque on the torque command value,
   wherein, when a shift occurs from a state where an output of the motors is zero to a state where the output is non-zero such that the preload torque is provided by the preload torque superimposition unit, at least one of the motors forms a contact portion between the drive mechanism and the motor by speed control based on the speed detection value detected in the speed detection unit such that the preload torque is provided, and wherein, when a shift occurs from the state where the output of the motors is zero to the state where the output is non-zero such that the preload torque is provided by the preload torque superimposition unit, position control is performed on at least one of the motors based on the position detection value detected in the position detection unit and the speed control is performed on at least one of the motors so as to form the contact portion, and in a state where the contact portion is formed, the preload torque is provided by the preload torque superimposition unit.

2. The controller according to claim 1, wherein the controller controls the motors such that, in a state where the contact portion is formed so as to remove a gap between a side of the drive mechanism and a side of the motor which is subjected to the speed control, the motor which is subjected to the speed control is switched to being subjected to position control based on the position command value calculated by the position command calculation unit so that the preload torque is provided.

* * * * *